(12) United States Patent
Sugiyama et al.

(10) Patent No.: US 8,090,073 B2
(45) Date of Patent: Jan. 3, 2012

(54) NUCLEAR POWER PLANT, METHOD OF REPLACEMENT IN THE SAME AND METHOD OF OPERATING THE SAME

(75) Inventors: Masashi Sugiyama, Tokyo (JP); Yukihiro Katayama, Tokyo (JP); Kenji Tominaga, Tokyo (JP); Hirohisa Satomi, Tokyo (JP); Ichirou Shimoda, Tokyo (JP)

(73) Assignee: Hitachi-GE Nuclear Energy, Ltd., Hitachi-shi, Ibaraki (JP)

(*) Notice: Subject to any disclaimer, the term of this patent is extended or adjusted under 35 U.S.C. 154(b) by 0 days.

(21) Appl. No.: 11/032,289

(22) Filed: Jan. 10, 2005

(65) Prior Publication Data
US 2005/0201507 A1    Sep. 15, 2005

(30) Foreign Application Priority Data
Jan. 19, 2004    (JP) .................................. 2004-009974

(51) Int. Cl.
 G21C 7/32    (2006.01)
 G21C 15/18    (2006.01)
(52) U.S. Cl. ........................................ 376/282; 376/210
(58) Field of Classification Search .................. 376/210, 376/277, 282
See application file for complete search history.

(56) References Cited

U.S. PATENT DOCUMENTS

| | | | | |
|---|---|---|---|---|
| 3,683,251 A | * | 8/1972 | Pisecker | 363/37 |
| 4,068,283 A | * | 1/1978 | Russell | 361/205 |
| 4,680,114 A | * | 7/1987 | Hayes | 210/192 |
| 6,172,488 B1 | * | 1/2001 | Mizutani et al. | 323/207 |

FOREIGN PATENT DOCUMENTS

| | | | |
|---|---|---|---|
| JP | 03-285597 | | 12/1991 |
| JP | 05034482 A | * | 2/1993 |
| JP | 05-268795 | | 10/1993 |
| JP | 08-074781 | | 3/1996 |
| JP | 08-080061 | | 3/1996 |
| WO | WO-99-42320 | * | 8/1999 |

OTHER PUBLICATIONS

S. Gibilisco, "The Illustrated Dictionary of Electronics", 8$^{th}$ Ed., McGraw-Hill. (2001), especially p. 733.*

* cited by examiner

*Primary Examiner* — Johannes P Mondt

(57) ABSTRACT

A recirculation pump motor is supplied with a power from a unit auxiliary middle voltage bus through a power supply system including a first circuit breaker, a voltage source inverter, and a second circuit breaker electrically connected in series to provide a no-load operation by use of the voltage source inverter. The second circuit breaker may be multiplexed with more than one breaker electrically connected in series. An existing nuclear plant using a induction motor driving a hydraulic coupling mechanically coupled to a synchronous generator for driving the recirculation pump, such as an MfG set, may be subjected to a method of replacing the induction motor, the hydraulic coupling, and the synchronous generator with the voltage source inverter and a circuit breaker through electrically disconnection and removal.

11 Claims, 4 Drawing Sheets

NUCLEAR POWER PLANT, METHOD OF REPLACEMENT IN THE SAME AND METHOD OF OPERATING THE SAME

FIELD OF THE INVENTION

The present invention relates to a nuclear power plant, a method of replacement in the same, and a method of operating the same, and particularly to a nuclear power plant, a method of replacement in the nuclear power plant, and a method of operation in the nuclear power plant, suitable for operating and controlling a primary loop recirculation (PLR) pump.

BACKGROUND OF THE INVENTION

Boiling water reactors (BWR) including a primary loop recirculation (PLR) system with a PLR pump to provide a flow of coolant for cooling to control an output of the reactor are known. In a BWR plant, a so-called MfG set including a variable speed hydraulic coupling for variably controlling a rotation speed of a motor coupled to the PLR pump is used as a PLR power supply to control a recirculation flow rate.

In the MfG set, power is supplied from a unit auxiliary middle voltage bus to an induction motor mechanically coupled to a variable rotation speed hydraulic coupling which is further mechanically coupled to a synchronous generator for generating power for driving the PLR pump motor, wherein the rotation speed control of the PLR pump motor is provided by controlling the variable speed hydraulic coupling. Upon controlling the flow rate in the core, kinetic momentum in the variable speed hydraulic coupling is controlled by a recirculation flow control signal from a reactor PLR control circuit to control the rotation speed of the PLR pump motor.

Another prior art PLR power supply for driving the PLR pump motor using a current source inverter instead of the MfG set in the nuclear power plant is disclosed in Japanese laid-open patent application No. 8-80061. In this prior art, the use of the current source inverter eliminates the necessity of the auxiliary devices of the MfG set such as the variable hydraulic coupling, a rotation machine, and a hydraulic device. This structure improves maintainability, efficiency in a low output condition, and linearity in speed control.

SUMMARY OF THE INVENTION

An aspect of the present invention provides a nuclear power plant capable of safely tripping a PLR (primary loop recirculation) pump at a high speed upon occurrence of a plant error such as turbine trip or load rejection.

A further aspect of the present invention provides a method of replacement in a nuclear power plant including a conventional MfG set or a current source inverter to provide the nuclear power plant with a PLR power supply including a voltage source inverter capable of safely tripping a PLR pump at a high speed upon occurrence of a plant error such as the turbine trip or the load rejection.

A further aspect of the present invention provides a method of operating a nuclear power plant with a PLR power supply including a voltage source inverter capable of safely tripping a PLR pump at a high speed upon occurrence of a plant error such as the turbine trip or the load rejection.

A further aspect of the present invention provides a nuclear power plant comprising: a nuclear reactor; a PLR pump motor for driving a PLR pump to re-circulate coolant in the nuclear reactor; a unit auxiliary middle voltage bus; a first circuit breaker; a voltage source inverter electrically coupled to the unit auxiliary middle voltage bus through the first circuit breaker; and a second circuit breaker, the voltage source inverter supplying power to the PLR pump motor through the second circuit breaker.

A further aspect of the present invention provides a method of replacement in a nuclear power plant with a PLR pump motor power supply system including a variable speed hydraulic coupling, a motor mechanically coupled to the variable speed hydraulic coupling, a first circuit breaker coupled to the motor, a generator mechanically coupled to the variable speed hydraulic coupling, and a PLR pump motor electrically coupled to the generator, comprising: removing the motor mechanically coupled to the variable speed hydraulic coupling and the synchronous mechanically coupled to the variable speed hydraulic coupling; providing a voltage source inverter; providing a second circuit breaker; and electrically coupling an output of the voltage source inverter to the PLR pump motor through the second circuit breaker.

A further aspect of the present invention provides a method of replacement in a nuclear power plant with a PLR pump motor power supply system including a current source inverter, a first circuit breaker electrically coupled to the current source inverter, and a PLR pump motor electrically coupled to the current source inverter, comprising: removing the current source inverter; providing a voltage source inverter; providing a second circuit breaker; and electrically coupling the output of the voltage source inverter to the PLR pump motor through the second circuit breaker.

A further aspect of the present invention provides a method of operating a nuclear power plant including a PLR pump motor for driving a PLR pump re-circulating coolant for the nuclear reactor, comprising: supplying power to the PLR pump motor through a unit auxiliary middle voltage bus, a first circuit breaker electrically coupled to the unit auxiliary middle voltage bus, a voltage source inverter electrically coupled to the first circuit breaker and a second circuit breaker electrically coupled to an output of the voltage source inverter; opening the second circuit breaker in response to a PLR pump trip signal; and stopping operation of the voltage source inverter in response to the PLR pump trip signal at the same time as the second circuit breaker is opened in response to the PLR pump trip signal.

A further aspect of the present invention provides a nuclear power plant including a PLR pump motor, comprising: a unit auxiliary middle voltage bus for supplying power to the PLR pump motor; and a voltage source inverter electrically coupled to the unit auxiliary middle voltage bus for supplying drive power to the PLR pump motor.

A further aspect of the present invention provides a method of replacement in a nuclear power plant with a PLR pump motor power supply system including an income circuit breaker receiving supply power, a PLR pump motor, and a drive circuit electrically coupled to the income circuit breaker for driving the PLR pump motor at a desired rotational speed, comprising: electrically isolating the income circuit breaker and the PLR pump motor from the drive circuit; providing a voltage source inverter; electrically coupling the voltage source inverter to the incoming circuit breaker; providing a circuit breaker; and electrically coupling an output of the voltage source inverter to the PLR pump motor through the circuit breaker.

A further aspect of the present invention provides a method of replacement in a nuclear power plant with a PLR pump motor power supply system including a current source inverter, an income circuit breaker electrically coupled to the current source inverter, and a PLR pump motor electrically coupled to the current source inverter, comprising: electrically isolating the income circuit breaker and the PLR pump motor from the current source inverter; providing a voltage source inverter; electrically coupling the voltage source inverter to the circuit breaker; providing a circuit breaker; and electrically coupling the output of the voltage source inverter to the PLR pump motor through the circuit breaker.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing embodiments of the present invention, a related art PLR (primary loop recirculation) pump power supply system will be further argued.

Figure 2:
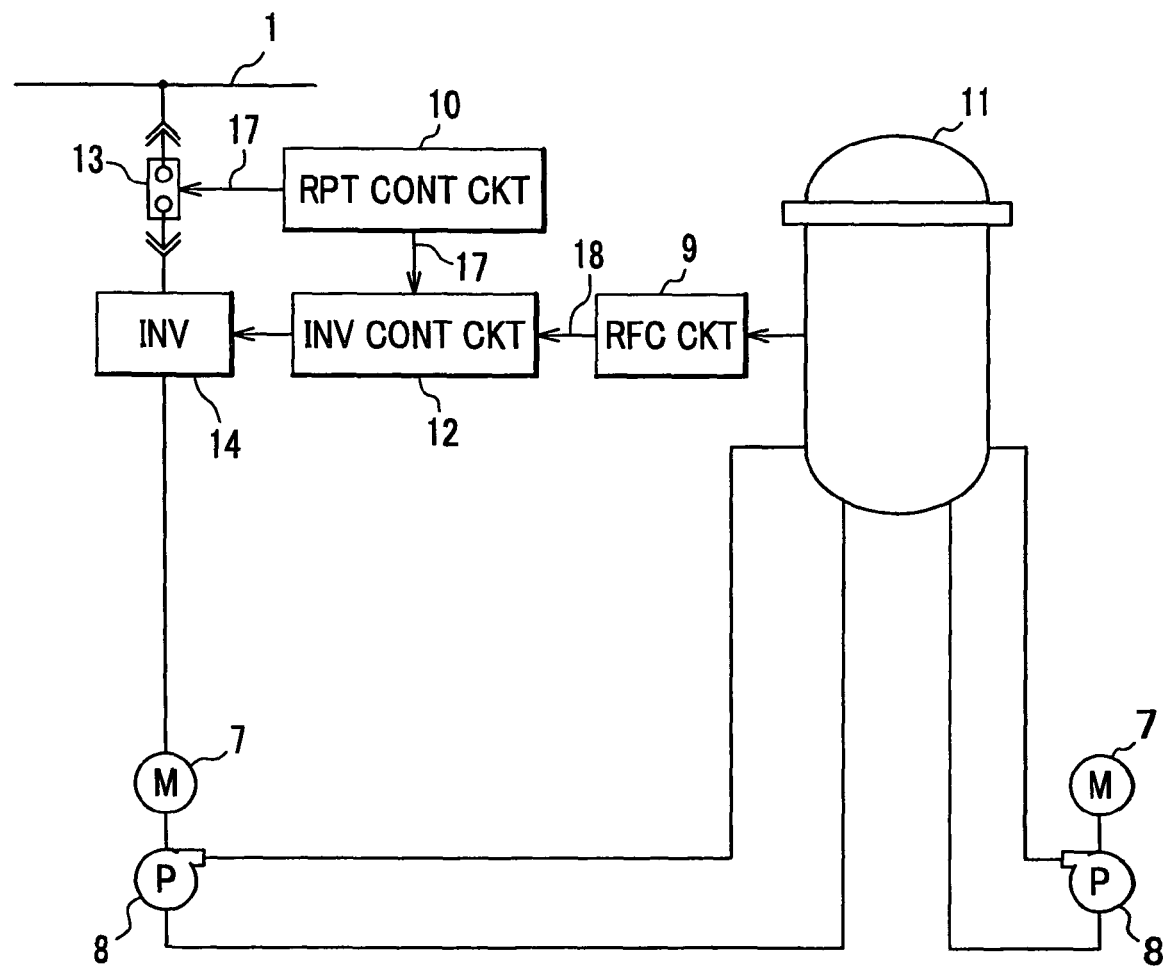
FIG. 2 is a related art PLR pump power supply system using a current source inverter, to which a method of replacement according to the present invention is applicable.

FIG. 2 illustrates a related art nuclear plant with a PLR pump power supply system using an inverter. This system includes a unit auxiliary middle voltage bus 1, an income circuit breaker 13 built in a supply transfer panel (not shown), a current source inverter 14, and an inverter control circuit 12 for controlling the current source inverter 14 in accordance with an inverter control signal 18 from a reactor recirculation flow control (RFC) circuit 9, which supplies power (for example, phase signals) to the PLR pump motor 7 for operation of the PLR pump 8.

The current source inverter 14 acts as a current source, which does not allow no-load operation in which an output 54 of the inverter is opened. Thus, upon occurrence of an error in the plant such as turbine trip or load shut down, the income circuit breaker 13 for the current source inverter 14 is tripped in response to a recirculation pump trip (RPT) signal 17 from an RPT control circuit 10, and the current source inverter 14 is stopped through the inverter control circuit 12 to trip two PLR pumps 8. Therefore, it is difficult to trip the PLR pumps 8 with safety at a high speed because of the current source inverter 14.

Will be described embodiments according to the present invention with reference to drawings.

First Embodiment

Figure 1:
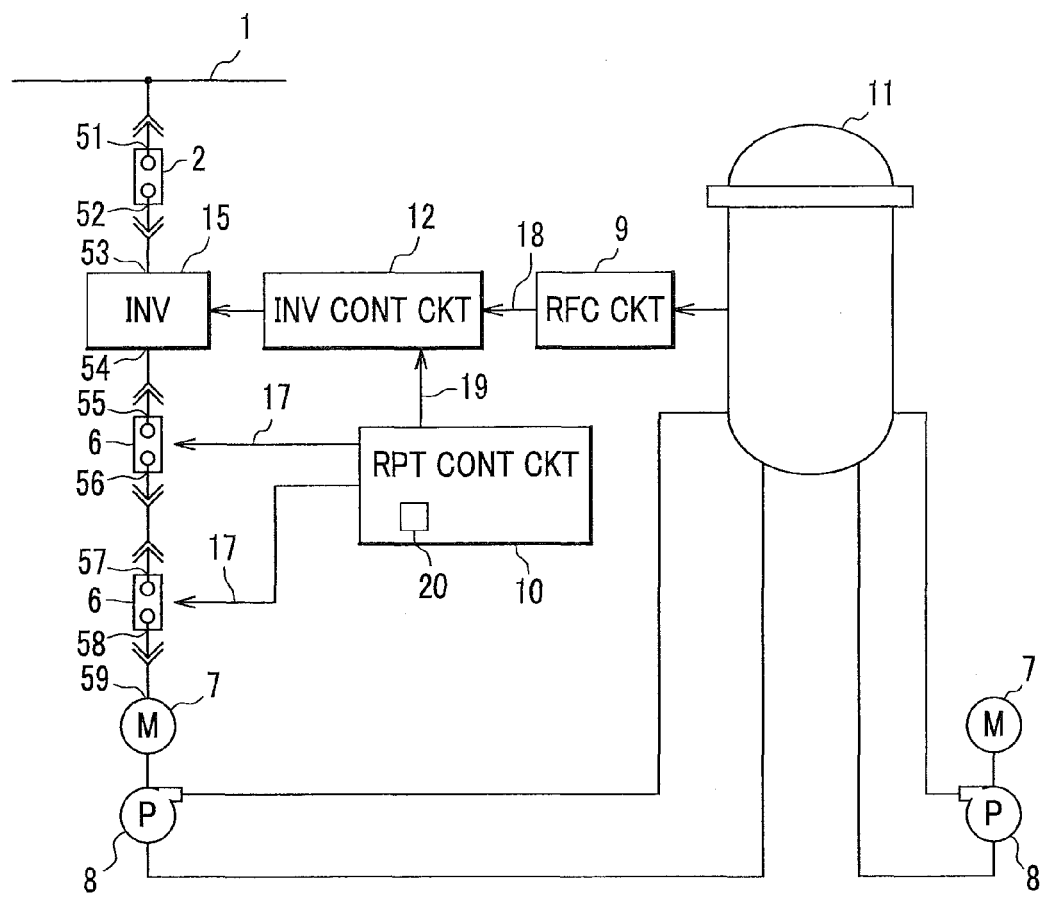
FIG. 1 is a block diagram of a nuclear plant according to an embodiment of the present invention.

FIG. 1 illustrates a nuclear power plant according to an embodiment of the present invention.

A PLR pump power supply system in the nuclear power plant in FIG. 1 comprises the unit auxiliary middle voltage bus 1, an income circuit breaker 2 electrically coupled to the unit auxiliary middle voltage bus 1, a voltage source inverter 15 electrically coupled to the income circuit breaker 2, two RPT circuit breakers (breakers) 6 electrically connected to an output 54 of the voltage source inverter 15, and the PLR pump motor 7 supplied with power (for example, phase signals) from the voltage source inverter 15 through the RPT circuit breakers 6. The first circuit breaker 6 is electrically coupled to the voltage source inverter 15 and is electrically connected to the second RPT circuit breaker 6 in series. The second RPT circuit breaker 6 is electrically coupled to the PLR pump motor 7 that mechanically coupled to the PLR pumps 8. The system further comprises an inverter control circuit 12 for controlling the voltage source inverter 15 in response to a control signal from the recirculation flow control (RFC) circuit 9 to supply power (phase drive signals) to the PLR pump motor 7, which drives the PLR pump 8.

The income circuit breaker 2 electrically coupled to the unit auxiliary middle voltage bus 1 comprises only a trip coil for general switching operation.

More specifically, an input 51 of the income circuit breaker 2 is electrically connected to the unit auxiliary middle voltage bus 1 with a cable. The output 52 of the income circuit breaker 2 is electrically connected to an input 53 of the voltage source inverter 15 with a cable. The output 54 of the voltage source inverter 15 is electrically connected to an input of the first RPT circuit breaker 6 with a cable. An output 56 of the first RPT circuit breaker 6 is electrically connected to an input 57 of the second RPT circuit breaker 6 with a cable or a bus bar. An output 58 of the second RPT circuit breaker 6 is electrically connected to the input 59 of the PLR pump motor 7 with a cable.

The voltage source inverter 15 receiving power from the unit auxiliary middle voltage bus 1 through the income circuit breaker 2 is controlled by the inverter control circuit 12 supplied with a signal from the RFC circuit 9. The RFC circuit 9 supplies an inverter signal 18 for decreasing a deviation of a processed value of a flow rate in the core from a command value to the inverter control circuit 12 that operates the voltage source inverter 15 by PWM (Pulse Width Modulation) control to provide operation at a constant voltage/frequency ratio to control, i.e., increase, decrease, or keep constant, the rotation speed of the PLR pump motor 7.

Generally, in the nuclear plant, when the turbine trip or the load shut down occurs during operation of the nuclear plant, to keep soundness of fuel, a recirculation pump trip control for moderating a transitional output increase of the reactor 11 is executed together with a scrum signal by tripping two PLR pumps 8 to rapidly decrease a reactor core flow. This control function is carried out by the RPT control circuit 10. The RPT control circuit 10 detects, when a turbine main steam stop valve (not shown) is closed by the turbine trip or when a turbine steam control valve (not shown) is closed due to the generator load rejection, the closing operation of these valves are detected by detection circuits, respectively, to generate the RPT signal 17.

The RPT signal 17 is generated by 2-out of 4 logic to increase its reliability to prevent an error trip in the PLR pump 8 due to a signal failure or the like of devices. Further, to surely trip the PLR pump 8 upon occurrence of an error of the plant, devices to be tripped in response to the RPT signal 17 are multiplexed.

In this embodiment, as cut off means responsive to the RPT signal, the RPT circuit breakers 6 are provided at the output 54 of the voltage source inverter 15 electrically connected in series to provide shutdown operation with both the RPT circuit breakers 6 by opening them for the purpose of multiplexing the trip operation devices to surely trip the PLR pump 8 upon an error in the nuclear plant.

Further, after occurrence of the recirculation pump trip, since it is unnecessary to operate the voltage source inverter 15, the RPT control circuit 10 has a function for stopping the voltage source inverter 15 by supplying either of open signals for the two RPT circuit breakers 6 to the inverter control circuit 12 as described below.

More specifically, the RPT control circuit 10 includes a delay timer 20. The RPT control circuit 10 detects, when a turbine main steam stop valve (not shown) is closed by the turbine trip or when a turbine steam control valve (not shown) is closed due to the generator load rejection, the closing operation of these valves are detected by detection circuits, respectively, to generate the RPT signal 17. In response to the RPT signal 17, the delay timer 20 measures a predetermined time interval. When the predetermined time interval is elapsed, a delayed PRT signal 19 is supplied to the inverter control circuit 12 to stop the inverter control circuit 12. However, the delay time may be zero or the RPT signal 17 may be supplied to the inverter control circuit 12 instead of the delayed PRT signal 19. In other words, the stop of the voltage source inverter 15 is at the same time as or after the open of the RPT circuit breakers 6.

Second Embodiment

Figure 3:
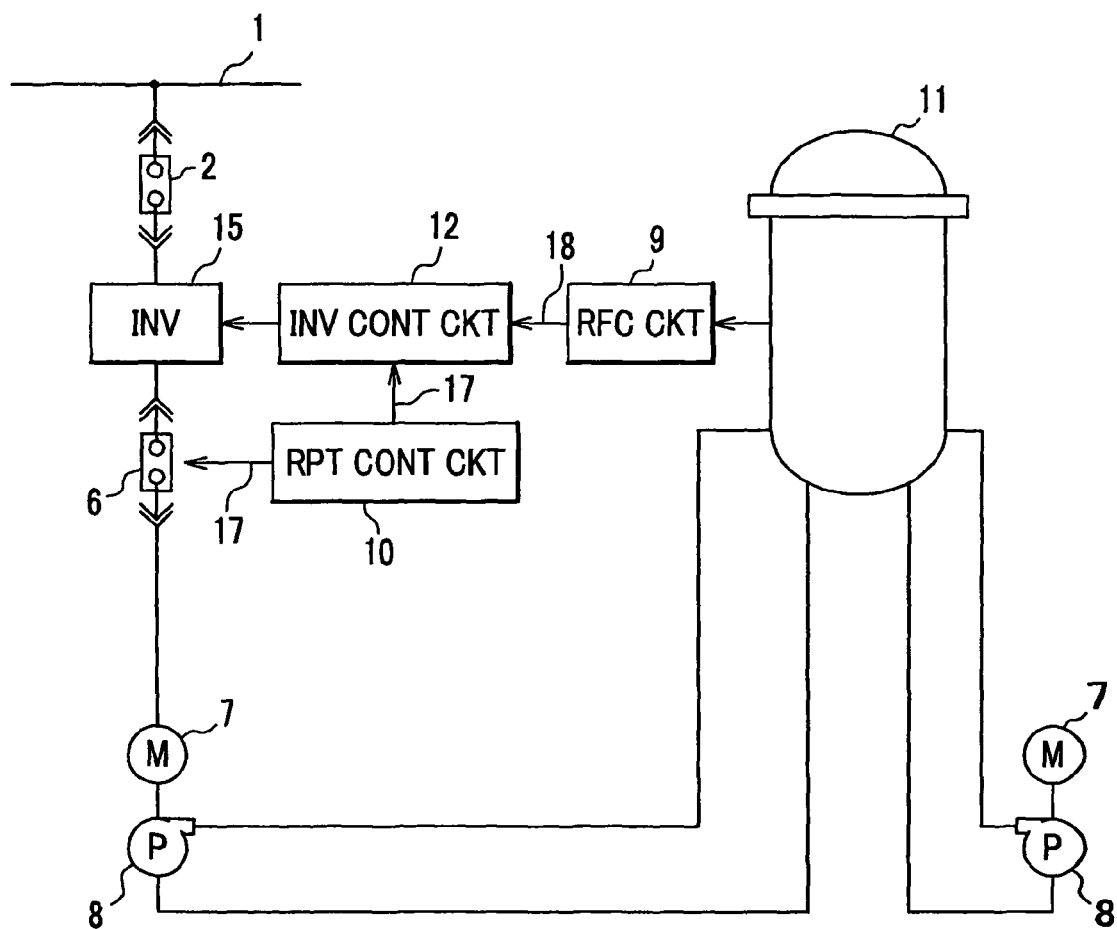
FIG. 3 is a block diagram of a nuclear plant according to an embodiment of the present invention.

FIG. 3 illustrates a nuclear power plant provided by modifying the first embodiment.

A PLR pump power supply system in the nuclear power plant in FIG. 3 comprises the unit auxiliary middle voltage bus 1, the income circuit breaker 2 electrically coupled to the unit auxiliary middle voltage bus 1, the voltage source inverter 15 electrically coupled to the income circuit breaker 2, the RPT circuit breaker 6 electrically connected to an output 54 of the voltage source inverter 15, and the PLR pump motor 7 supplied with power from the RPT circuit breaker 6. The system further comprises the inverter control circuit 12 for controlling the voltage source inverter 15 in response to the control signal from the RFC circuit 9 by supplying power to the PLR pump motor 7 to drive the PLR pump 8.

More specifically, the input 53 of the voltage source inverter 15 is electrically connected to the output 52 of the income circuit breaker 2 with a cable and its output 58 is electrically connected to the PLR pump motor 7 with a cable.

Upon occurrence of the turbine trip or the generator load rejection, to keep soundness of fuel, the RPT signals 17 are generated by the RPT control circuit 10.

In this embodiment, in the RPT control circuit 10, the RPT signals 17 are independently generated through the 2-out of 4 logic and supplied to the RPT circuit breaker 6 for an opening operation and to the inverter control circuit 12 for stop of the voltage source inverter 15. This multiplexes the device to be tripped in response to the RPT signals, providing a structure surely tripping the PLR pump 8.

The first and second embodiments have been described with examples in which the present invention is applied to a newly build nuclear power plant. However, this invention is applicable to existing nuclear power plates by replacing the existing devices to provide the structures of the first and second embodiments.

Third Embodiment

Figure 4:
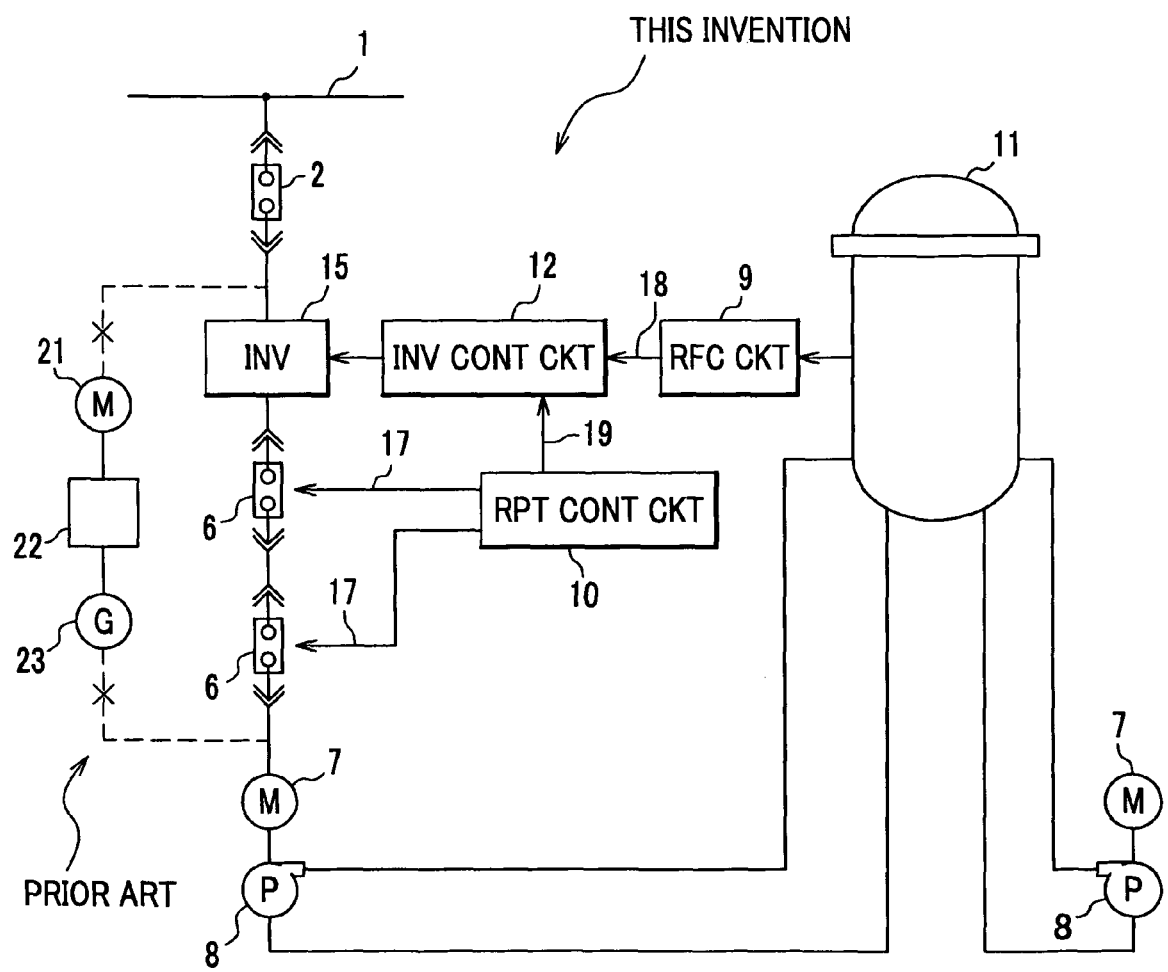
FIG. 4 is an illustration describing a method of replacement according to the present invention.

If a nuclear power plant includes the PLR power supply system for the MfG set, replacement is done as shown in FIG. 4.

First, are removed an induction motor 21 supplied with a power from the unit auxiliary middle voltage bus 1 through the income circuit breaker 2, a hydraulic coupling 22 mechanically connected to the induction motor 21, and a synchronous generator 23 mechanically coupled to the hydraulic coupling 22 supplying phase signals supplied to the PLR pump motor 7 through electrical and mechanical isolation.

Second, the voltage source inverter 15 is installed and its input 53 is electrically connected to the unit auxiliary middle voltage bus 1 through the income circuit breaker 2. The output 54 of the voltage source inverter 15 is electrically coupled (electrically connected) to the PLR pump motor 7 through one RPT circuit breaker 6 or two RPT circuit breakers 6 with cables to supply voltage phase signals to the PLR pump motor 7.

Further, the inverter control circuit 12, the RFC circuit 9, and the RPT control circuit 10 are installed and electrically coupled to devices as described in the first and second embodiments.

This provides replacement in the nuclear power plant including PLR power supply system for the MfG set.

According to the present invention, if a nuclear power plant is subjected to expanding its life by maintenance, the replacement of the system including the MfG set with the system including the voltage source inverter 15 provides the following an advantageous effect.

In the case of an existing nuclear power plant including a power supply for the PLR pump for the MfG set, according to the present invention, maintainability, efficiency at a low output operation, and controllability of rotation speed, of the MfG set and auxiliary devices in the MfG set can be improved. Further, the existing circuit breaker 2 and cables from the existing circuit breaker 2 to the PLR pump motor 7 can be reused, which simplifies the modifying process.

Further, this invention is also applicable to a nuclear power plant including a current source inverter to replace the current source inverter with the voltage source inverter.

In the case of an existing nuclear power plant (FIG. 2) with the PLR power supply system for the PLR pump 7 including the current source inverter 14, first, the current source inverter 14 is electrically isolated (disconnected) from the PLR pump 7 and from the income circuit breaker 13 and is removed. The voltage source inverter 15 is installed on the side of the PLR pump motor 7 with respect to the income circuit breaker 13 that was electrically connected to the current source inverter. In other words, the voltage source inverter 15 is electrically connected to the income circuit breaker 13, corresponding to the income circuit breaker 2, to receive the power from the unit auxiliary middle voltage bus 1 via its input through the existing income circuit breaker 13. The voltage source inverter 15 is electrically connected, via its output, to the PLR pump motor 7 through newly provided RPT circuit breakers 6. Further, a cable for the RPT signal 17 of the RPT control circuit 10 is electrically isolated (disconnected) from the income circuit breaker 13, and is electrically connected to the first and second RPT circuit breakers 6 and 6 between the voltage source inverter 15 and the PLR pump motor 7. Thus, the power supply including the current source inverter 14 shown in FIG. 2 is modified as shown in FIG. 1.

If a nuclear power plant including the existing MfG set was subjected to replacement with a current source inverter, it would be necessary to adjust control coefficients of the current inverter in a combination test with the PLR pump in advance. This is problematic because of a lot of days necessary for the replacement operation. Further, if the current source inverter 14 was used, to provide the PLR pump trip function, it would be necessary to install a circuit breaker including a double trip coil having a special specification on a unit auxiliary middle voltage bus panel.

On the other hand, according to the present invention, the voltage source inverter 15 is used in the nuclear power plant, which eliminates the necessity of the combination test with the PLR pump. This enables the reduction in the number of replacement operations.

Further, the nuclear power plant using the voltage source inverter 15 according to the present invention allows, as the income circuit breaker for supplying power to the PLR pump, use of a circuit breaker that is similar to a circuit breaker employing a general single trip coil. This eliminates the necessity of a power supply with a special specification on the unit auxiliary middle voltage bus, which provides a nuclear power plant with easiness in maintenance of the power supply panel at a low cost and with high speed and safe tripping of the PLR pump.

The method of replacement of the power supply for the MfG set in the second embodiment may be modified. First, the power supply (a driving circuit) including the induction motor 21, the hydraulic coupling 22, and the synchronous generator 23 is electrically isolated from the income circuit breaker 2 and the PLR pump motor 7 without removal if there is a space for installation. More specifically, the income circuit breaker 2 is electrically disconnected from the induction motor 21 (FIG. 4), and the PLR pump motor 7 is electrically disconnected from the synchronous generator 23.

Second, the voltage source inverter 15 is installed, and its input 53 is electrically connected to the unit auxiliary middle voltage bus 1 through the income circuit breaker 2. The output 54 of the voltage source inverter 15 is electrically coupled to the PLR pump motor 7 through one RPT circuit breaker 6 or two RPT circuit breakers 6 to supply voltage phase signals to the PLR pump motor 7 as similar to the second embodiment.

Similarly, in the method of replacement of the power supply for the current source inverter set in the second embodiment may be modified. First, the current source inverter 14 (FIG. 2) is electrically isolated from the income circuit breaker 13 (2) and the PLR pump motor 7 without removal if there is space. More specifically, the income circuit breaker 13 is electrically isolated (disconnected) from the induction motor 21 shown in FIG. 4 (disconnected from the cable connected to the induction motor 21 at the induction motor 21), and the PLR pump motor 7 is electrically isolated (disconnected) from the synchronous generator 23 (disconnected from the cable connected to the synchronous generator 23 at the synchronous generator 23) without removal if there is a space for installation.

Second, the voltage source inverter 15 is installed and its input 53 is electrically connected to the unit auxiliary middle voltage bus 1 through the income circuit breaker 13 (with the cable that was disconnected from the induction motor 21). The output 54 of the voltage source inverter 15 is electrically coupled to the PLR pump motor 7 through one RPT circuit breaker 6 or two RPT circuit breakers 6 to supply voltage phase signals to the PLR pump motor 7 as similar to the third embodiment. More specifically, the output 54 of the voltage source inverter 15 is electrically connected to the PLR pump motor 7 with the cable that was disconnected from the synchronous generator 23.

In the second and third embodiments, the connection of the cable to the newly provided devices such as the voltage source inverter 15 is done after disconnection of the cable from device that became unused. However, for example, if the income circuit breaker 2 has auxiliary output terminals, it is possible to electrically connect the income circuit breaker 2 to the voltage source inverter 15 with newly provided cable before electrical isolation (disconnection) of the income circuit breaker 2 from the induction motor 21 or the current source inverter 14. Thus, the order of disconnection and connection processes can be reversed. However, the connection is done after installation of, for example, the voltage source inverter 15.

In the first embodiment, the first and second RPT circuit breakers 6 and 6 are connected in series. Thus, the first and second RPT circuit breakers 6 and 6 are opened in response to the recirculation pump trip signal at the same time. This provides redundancy in the trip control, so that the voltage source inverter 15 can be stopped after the trip of the first and second RPT circuit breakers 6 and 6. However, the voltage source inverter 15 can be stopped at the same time as the first and second RPT circuit breakers 6 and 6.

In the second embodiment, the RPT circuit breaker 6 and the voltage source inverter 15 shown in FIG. 3 are tripped at the same time in response to the recirculation pump trip signal to provide redundancy in the tripping control.

What is claimed is:

1. A nuclear power plant comprising:
   a nuclear reactor;
   a recirculation flow control circuit configured to generate an inverter control signal to decrease a deviation of a processed value of a flow rate in the nuclear reactor from a command value;
   a primary loop recirculation pump motor coupled to a primary loop recirculation pump is configured to re-circulate coolant in the nuclear reactor;
   a bus configured to supply electrical power to the primary loop recirculation pump motor;
   a first circuit breaker including an input connected to the bus;
   a voltage source inverter, connected to an output of the first circuit breaker, electrically connected to the bus through the first circuit breaker;
   a second circuit breaker including an input connected to an output of the voltage source inverter and an output connected to the primary loop recirculation pump motor;
   an inverter control circuit configured to control the voltage source inverter on the basis of the inverter control signal, the inverter control circuit coupled between the voltage source inverter and the recirculation flow control circuit;
   a recirculation pump trip control circuit with an output connected to the second circuit breaker and the inverter control circuit, whereby the recirculation pump trip control circuit is configured to send a recirculation pump trip signal in response to a recirculation pump trip condition;
   wherein the voltage source inverter is configured to supply drive power to the primary loop recirculation pump motor through the second circuit breaker, and
   wherein the second circuit breaker is configured to disconnect the voltage source inverter from the primary loop recirculation pump motor in response to the recirculation pump trip signal such that the output of the voltage source inverter is open.

2. The nuclear power plant as claimed in claim 1, wherein the second circuit breaker comprises first and second breakers electrically connected in series that are configured to be opened in response to the recirculation pump trip signal for emergency shut down of the primary loop recirculation pump.

3. The nuclear power plant as claimed in claim 2, wherein the inverter control circuit is configured to stop the voltage source inverter in response to the recirculation pump trip signal.

4. The nuclear power plant as claimed in claim 2, further comprising a delay timer provided in the recirculation pump trip control circuit configured to stop the voltage source inverter when a predetermined interval, measured by the delay timer, elapses from reception of the recirculation pump trip signal.

5. The nuclear power plant as claimed in claim 1, wherein the inverter control circuit is configured to stop the voltage source inverter in response to the recirculation pump trip signal, and the second circuit breaker is configured to be opened in response to the recirculation pump trip signal for emergency shut down of the primary loop recirculation pump.

6. A nuclear power plant including a nuclear reactor and a primary loop recirculation pump motor, comprising:
   a voltage bus supplying power to the primary loop recirculation pump motor;
   a recirculation flow control circuit that is configured to generate an inverter control signal decreasing a deviation of a processed value of a flow rate in the reactor from a command value;
   a voltage source inverter with an input electrically connected to the voltage bus, the voltage source inverter configured to supply drive power to the primary loop recirculation pump motor on the basis of the inverter control signal to the primary loop recirculation pump motor, and the voltage source inverter configured to stop, in response to a stop signal, generation of the drive power;
   a first circuit breaker electrically connected to a second circuit breaker, the first and second circuit breakers supplying and, in response to a recirculation pump trip signal, configured to shut down the drive power to the primary loop recirculation pump motor, wherein the input of the first circuit breaker is connected to the output of the voltage source inverter, and the output of the second circuit breaker is connected to the recirculation pump motor;
   an inverter control circuit with an output connected to the voltage source inverter configured to provide the stop signal and with an input connected to the recirculation flow control circuit; and
   a recirculation pump trip control circuit with an output electrically connected to and directly outputting the recirculation pump trip signal to each of the first circuit breaker, the second circuit breaker, and the inverter control circuit, wherein the first circuit breaker and the second circuit breaker configured to disconnect the voltage source inverter from the primary loop recirculation pump motor in response to the recirculation pump trip signal such that the output of the voltage source inverter is open.

7. The nuclear power plant as claimed in claim 1, wherein the second circuit breaker is configured to be tripped open in response to a recirculation pump trip signal for emergency shut down of the primary loop recirculation pump.

8. The nuclear power plant as claimed in claim 6, further comprising:
   a delay timer provided in the recirculation pump trip control circuit configured to generate the stop signal delayed by a predetermined interval from receiving the recirculation pump trip signal.

9. The nuclear power plant as claimed in claim 1, the second circuit breaker includes a structure for opening an output of the voltage source inverter and disconnects the voltage source inverter from the primary loop recirculation pump motor.

10. A nuclear power plant comprising:
    a nuclear reactor;
    a recirculation flow control circuit configured to generate an inverter control signal decreasing a deviation of a processed value of a flow rate in a core of the nuclear reactor from a command value;
    a primary loop recirculation pump motor driving a primary loop recirculation pump configured to re-circulate coolant in the nuclear reactor to provide a reactor core flow of the coolant;
    a bus supplying electrical power to the primary loop recirculation pump motor;
    a first circuit breaker including an input connected to the bus;
    a voltage source inverter, with and input connected to an output of the first circuit breaker, electrically connected to the bus through the first circuit breaker, configured to supply drive power on the basis of the inverter control signal to the primary loop recirculation pump motor;
    a second circuit breaker including a couple of circuit breakers connected in series, the second circuit breaker including an input connected to an output of the voltage source inverter and an output connected to the primary loop recirculation pump motor;
    a recirculation pump trip control circuit with an output connected to and configured to directly output a recirculation pump trip signal to the second circuit breaker, wherein the voltage source inverter configured to supply drive power to the primary loop recirculation pump motor through the second circuit breaker; and
    wherein the second circuit breaker disconnects the output of the voltage source inverter and to disconnect the voltage source inverter from the primary loop recirculation pump motor in response to the recirculation pump trip signal to decrease the reactor core flow.

11. A nuclear power plant including a nuclear reactor and a primary loop recirculation pump motor configured to re-circulate coolant to provide a reactor core flow of the coolant in a nuclear reactor of the nuclear power plant, comprising:
    a recirculation flow control circuit that generates an inverter control signal configured to decrease a deviation of a processed value of a flow rate in the reactor from a command value;
    a voltage bus configured to supply power;
    a voltage source inverter with an input electrically connected to the voltage bus, the voltage source inverter configured to supply drive power on the basis of the inverter control signal to the primary loop recirculation pump motor, and the voltage source inverter configured to stop, in response to a stop signal, generation of the drive power; and
    a circuit breaker with an input connected to the voltage source inverter and an output connected to the primary loop recirculation pump motor, wherein in response to a recirculation pump trip signal received from a recirculation pump trip control circuit coupled to the circuit breaker, the circuit breaker being configured to shut down the drive power to the primary loop recirculation pump motor by disconnecting the output of the voltage source inverter from the primary loop recirculation pump motor decreasing the reactor core flow.

\* \* \* \* \*